United States Patent
Ohbayashi et al.

(10) Patent No.: US 8,034,201 B2
(45) Date of Patent: Oct. 11, 2011

(54) INDUCTION HARDENING METHOD AND JIG USED IN INDUCTION HARDENING PROCESS

(75) Inventors: Kouji Ohbayashi, Aichi (JP); Kazuaki Okada, Okazaki (JP)

(73) Assignee: AISIN AW Co., Ltd., Aichi-ken (JP)

( * ) Notice: Subject to any disclaimer, the term of this patent is extended or adjusted under 35 U.S.C. 154(b) by 654 days.

(21) Appl. No.: 11/660,158

(22) PCT Filed: Oct. 21, 2005

(86) PCT No.: PCT/JP2005/019373
§ 371 (c)(1),
(2), (4) Date: Sep. 26, 2008

(87) PCT Pub. No.: WO2006/043653
PCT Pub. Date: Apr. 27, 2006

(65) Prior Publication Data
US 2009/0101246 A1    Apr. 23, 2009

(30) Foreign Application Priority Data

Oct. 21, 2004    (JP) .................................. 2004-306886

(51) Int. Cl.
*C21D 8/10* (2006.01)
*C21D 8/00* (2006.01)
*C21D 9/32* (2006.01)
(52) U.S. Cl. ........................................ 148/570; 266/160
(58) Field of Classification Search .................. 148/570; 266/160
See application file for complete search history.

(56) References Cited

U.S. PATENT DOCUMENTS
6,576,877 B2 *  6/2003  Dabelstein et al. ........... 219/640

FOREIGN PATENT DOCUMENTS
| JP | 3-128649 |     | 12/1991 |
| JP | 09-302419 |     | 11/1997 |
| JP | 11-131133 |     | 5/1999 |
| JP | 2001020017 | A * | 1/2001 |

OTHER PUBLICATIONS

Machine translation of JP2001-020017A, Jan. 2001.*

* cited by examiner

*Primary Examiner* — Jie Yang
(74) *Attorney, Agent, or Firm* — Bacon & Thomas, PLLC

(57) ABSTRACT

The present invention provides a method for induction hardening of a steel member having an outer ring portion and, more specifically, for induction hardening of an outer circumferential surface of the outer ring portion. The method uses two pressing members, each of which includes a flat basal surface and a projecting portion projecting therefrom. Each of the projecting portions has a cross-section in the shape of a perfect circle. Also, the projecting portions have, on the outer circumferences thereof, respective pressing surfaces. While gaps are maintained between axial end faces of the outer ring portion and the basal surfaces of the pressing members, the pressing members are pressed against the outer ring portion so that the pressing surfaces each abut against the inner circumference side of the outer ring portion. While a biasing force is applied to the pressing members, the induction hardening process is applied to the outer circumferential surface. During the induction hardening process, the pressing members are moved toward each other until the basal surfaces abut against respective axial end faces of the outer ring portion.

14 Claims, 15 Drawing Sheets

FIG. 7A
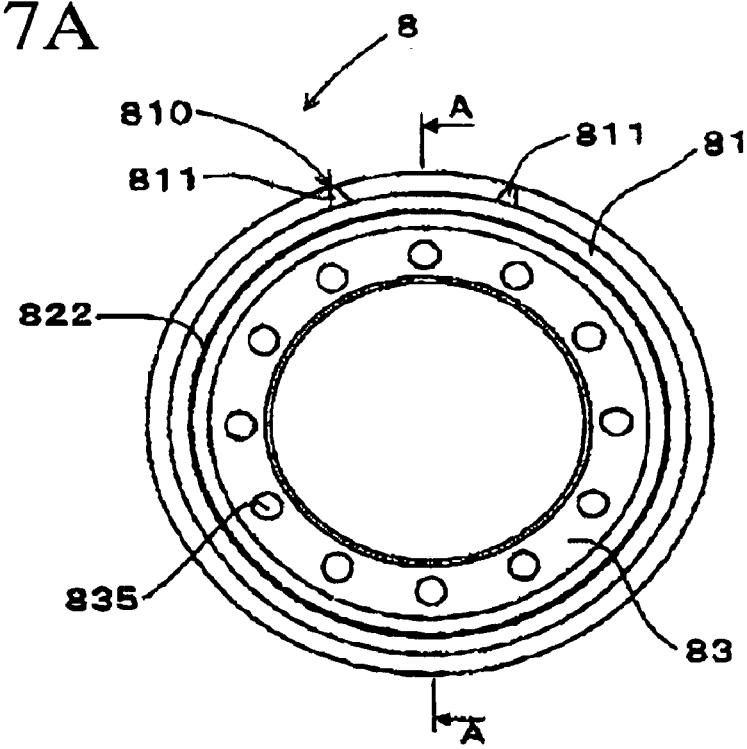
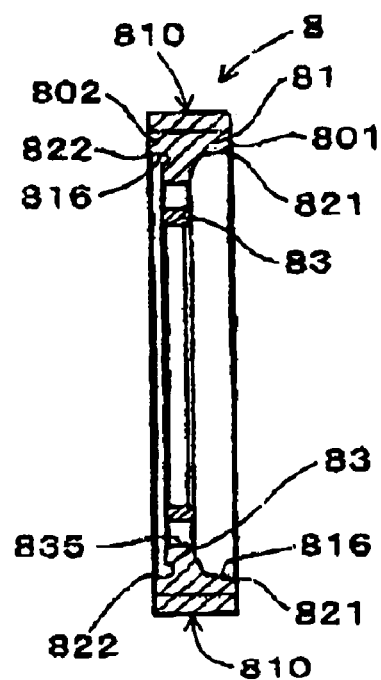
FIG. 7B

INDUCTION HARDENING METHOD AND JIG USED IN INDUCTION HARDENING PROCESS

TECHNICAL FIELD

The present invention relates to a method for improving the dimensional precision in an induction hardening process applied to a ring-shaped steel member.

BACKGROUND ART

Ring-shaped steel members such as gears having teeth on their outer circumferential surface are popularly used as parts in various types of mechanical apparatus. For example, a large number of gears including differential ring gears and counter gears are used in automatic transmissions in automobiles.

Generally, such ring-shaped steel members are required to have high-strength characteristics. An example of a method for imparting high-strength characteristics is an induction hardening process applied to the outer circumferential surfaces of the steel members.

The induction hardening process works extremely well as a method for enhancing the strength of the steel members, but also has a possibility of lowering the degree of precision in the dimensions. For example, after an induction hardening process is performed, the roundness of a ring-shaped part may be inferior to the roundness before the process is performed. If the part is of such a type that a loss of roundness does not lower its performance level, there is no problem. However, if the part is of such a type that a loss of roundness lowers its level of performance, it is necessary to add a correction process, after the induction hardening process is performed, in order to improve the roundness of the part.

For this reason, development of a method for preventing loss of roundness during an induction hardening process has been in demand. However, a satisfactory solution had not yet been found.

For example, Japanese Kokai 11-131133 discloses a jig for improving roundness of a circular-tube-shaped member after an induction hardening process has been performed on the inner circumferential surface of the circular-tube-shaped member. It is, however, not possible to use the disclosed jig to improve the roundness when an induction hardening process is performed on the outer circumferential surface of a part.

DISCLOSURE OF THE INVENTION

Problems to be Solved by the Invention

In view of the problems described above with the related art, an objective of the present invention is to provide an induction hardening method and a jig for use therein that are able to prevent a loss of roundness in a ring-shaped steel member.

Means for Solving the Problems

A first aspect of the present invention provides an induction hardening method for treating a steel member having an outer ring portion substantially in the shape of a circular tube, to harden an outer circumferential surface of the outer ring portion. The induction hardening method of the invention uses a pressing member that includes a substrate having a first basal surface and a projecting portion projecting from a central portion of the basal surface, the projecting portion having a cross-section in the shape of a perfect circle and having a pressing surface on its outer circumferential edge. The pressing member is pushed against an axial end face of the outer ring portion with at least a part of the pressing surface abutting against the inner circumferential surface of the outer ring portion while a gap is initially maintained between the axial end face and the basal surface. A force is applied to the outer circumferential surface of the outer ring portion by application of a biasing force to the pressing member in such a direction that the pressing member approaches the steel member, causing the pressing member to move forward relative to the steel member until the basal surface abuts against the axial end face during the induction hardening.

Thus, the induction hardening method according to the present invention uses a jig that includes the pressing member specially configured to include the pressing surface and the basal surface.

During the induction hardening process, the outer circumferential surface of the outer ring portion is first inductively heated and therefore thermally expands. Consequently, the inner circumferential surface of the outer ring portion and the pressing surface naturally move away from each other. However, because a biasing force is applied to the pressing member in such a direction that the pressing member approaches the steel member, i.e., the pressing member moves forward relative to the steel member, at least in an initial stage where the degree of the thermal expansion of the outer ring portion is small, the pressing surface remains abutted against the inner circumferential side of the outer ring portion, whereby a force that enhances the degree of roundness is transferred from the pressing surface to the inner circumferential surface of the outer ring portion. Consequently, it is possible to maintain the roundness during the heating process.

However, as the outer ring portion continues to expand during the heating process, with the pressing member moving forward relative to the steel member undergoing induction hardening, the basal surface around the pressing surface comes into contact with the axial end face of the outer ring portion, thus limiting that forward movement. At this point in time, when the outer ring portion expands further, the inner side of the outer ring portion and the pressing surface are separate from each other. Of course, it is also acceptable to maintain the abutting contact between these elements by adjusting their dimensional relationship.

Subsequently, in the induction hardening process, the steel member is rapidly cooled using, for example, water and the outer ring portion contracts due to the cooling. Consequently, even in the case where the pressing surface and the inner circumferential surface of the outer ring portion separate from each other during the heating process, at the end of the process they return to the state in which they abut against each other. Thus, these two elements press against each other with a high force when the steel member contracts due to the cooling. Because the inner circumferential surface of the outer ring portion is strongly pressed against the pressing surface, the degree of roundness is maintained.

It is preferable that the basal surface of the pressing member extends around the entire outer circumference of the projecting portion, i.e., around the pressing surface. However, it is also acceptable to have the basal surface provided at only one or more portions of the periphery, instead of around the entire periphery.

Further, in a second aspect the present invention provides a jig to be used in a hardening process by attachment to a steel member having an outer ring portion substantially in the shape of a circular tube, while induction hardening is performed on an outer circumferential surface of the outer ring portion. The jig includes a pressing member that includes a substrate having a flat basal surface and a projecting portion projecting from a central portion of the basal surface, the projecting portion having a cross section in the shape of a perfect circle and an outer circumference edge serving as a pressing surface configured so that at least a part abuts against the inner circumferential surface of an outer ring portion of a steel member to be treated, with a gap between an axial end face of the outer ring section and the basal surface.

BRIEF DESCRIPTION OF THE DRAWINGS

FIG. 7A is a plan view of a steel member treated according to the first embodiment.

FIG. 7B is a cross-sectional view taken along line A-A in FIG. 7A.

DESCRIPTION OF THE PREFERRED EMBODIMENTS

Figure 1:
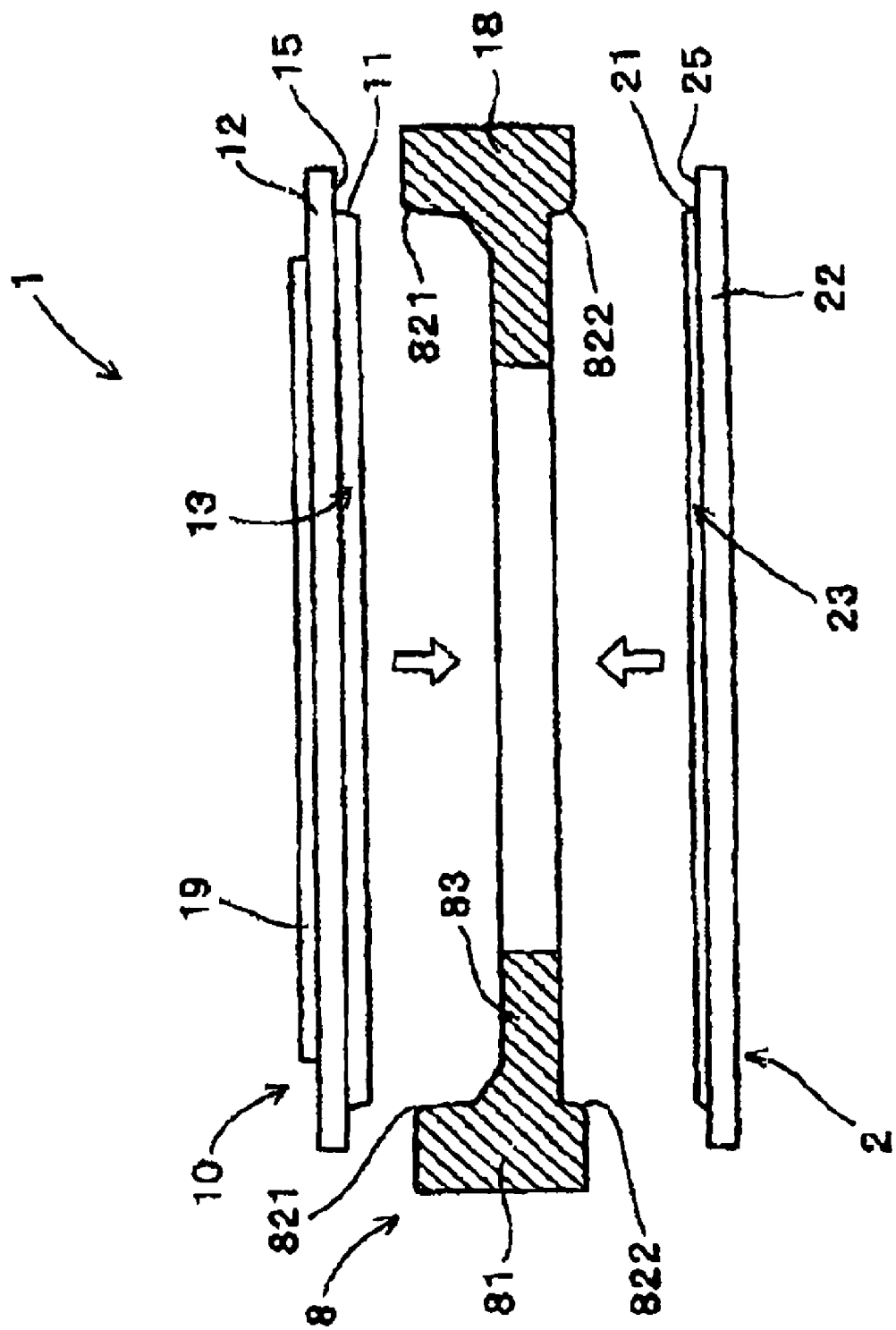
FIG. 1 is a schematic view of a jig used in the hardening process for a steel member in accordance with a first embodiment of the present invention.

Preferably, the first pressing member is configured so as to abut against the outer ring portion from one axial end face and the second pressing member is configured so as to abut against the outer ring portion from the other axial end face to sandwich the steel member therebetween. The pressing surface of the first pressing member and the pressing surface of the second pressing member respectively abut against axially opposed regions of the inner cylindrical surface of the outer ring portion while the induction hardening process is performed, for application of a biasing force biasing the first and second pressing members together.

The induction hardening process is performed while the steel member is sandwiched between the first pressing member and the second pressing member. As a result, the pressing surfaces of the two pressing members function so as to improve the roundness of their respective contact regions of the outer ring portion. In other words, it is possible to improve the roundness from both axial ends of the outer ring portion. Consequently, it is also possible to avoid taper defects which are caused by diameter variations in the axial direction.

In addition, it is preferable that the pressing surface of the pressing member is a tapered surface having an outside diameter becoming smaller toward the tip thereof. With this arrangement, it is possible to easily bring the pressing surface into contact against the inner circumferential surface of the outer ring portion.

It is also preferable that the pressing surface of the pressing member abuts against a corner (apex angle) portion formed at the intersection between the axial end face and the inner circumferential surface of the outer ring portion. With this arrangement, it is possible to realize more easily contact of the tapered pressing surface against the inner side of the outer ring portion.

The pressing member may be in the shape of a truncated cone or a circular cylinder having a distal end with a flat planar surface, so that the corner where the pressing surface joins that planar surface abuts against the inner circumferential surface of the outer ring portion.

In addition, it is preferred that the steel member is a ring gear having teeth on the outer circumferential surface of the outer ring portion. For example, with ring gears such as differential ring gears used in automatic transmissions of automobiles or the like, it is necessary to harden the surfaces of the teeth provided on the outer circumferential surface, and also it is necessary provide a high level of roundness. In achieving these effects, the induction hardening process according to the present invention is extremely effective.

According to the second aspect of the present invention, the jig used in the hardening process includes first and second pressing members, the first pressing member being configured so as to abut against the outer ring portion from one axial end face and the second pressing member being configured so as to abut against the outer ring portion from the other axial end face. In using the jig, the steel member is sandwiched between the first pressing member and the second pressing member and that the pressing surface of the first pressing member and the pressing surface of the second pressing member respectively abut axially opposing regions of the outer ring portion on the inner circumference side.

When the jig intended for hardening is as described above, it is possible to perform the induction hardening process while the steel member is sandwiched between the two pressing members. Thus, it is possible to maintain the level of roundness and to inhibit taper defects.

Further, it is preferred that the pressing surface of the pressing member is a tapered surface, slanted so that the outside diameter of the pressing member becomes smaller toward the tip thereof. With this design, because of the tapered surface, it is possible to easily achieve abutment of the pressing member against the inner circumference side of the outer ring portion.

The projecting portion having the pressing surface may be in the shape of one of a truncated cone and a circular cylinder. When the projecting portion is in the shape of a truncated cone, the pressing surface will have a tapered surface.

In its first and second aspects, the present invention is applicable to various types of steel members including: a part corresponding to only the outer ring portion; a part that has, inside the outer ring portion, an inner annular portion that is thinner than the outer ring portion; a part in which the inner annular portion is positioned in the vicinity of the center of the inner circumferential surface of the outer ring portion and wherein the outer ring portion has corner (apex angle) portions on both sides; and a part in which the inner annular portion is joined with one of the axial end faces of the outer ring portion, and the outer ring portion has a corner portion only on the axially opposite face.

First Embodiment

An induction hardening method and a jig to be used in a hardening process according to an embodiment of the present invention will be explained with reference to FIG. 1 through FIG. 7.

According to the first embodiment, as shown in FIGS. 7A and 7B, an induction hardening is performed on an outer circumferential surface 810 of an outer ring portion 81 of a steel member 8. The outer ring is substantially in the shape of a circular tube. To be more specific, the steel member 8 is a differential ring gear that is a component of an automatic transmission (A/T) in an automobile. The steel member 8 has, on the outer circumferential surface 810 of the outer ring portion 81, a tooth portion including a large number of teeth 811. On the inner circumference side of the outer ring portion 81 is an inner annular portion 83 that has a smaller axial thickness than the outer ring portion 81. The inner annular portion 83 extends from the axial middle of the inner circumferential surface 816 of the outer ring portion 81 so that the inner circumferential surface 816 extends axially from both sides of the inner annular portion 83. Inner corners 821 and 822 are formed at each of the two axial end faces 801 and 802 where they intersect the inner circumferential surface 816. As shown in FIGS. 4A through 4D, which are explained later, the inner corners 821 and 822 are formed by a chamfering process. One of the two inner corners portions serves as the apex angle portion of the present invention.

A jig 1 used in a hardening process according to the present embodiment includes two pressing members, i.e., first pressing member 10 and a second pressing member 2 as shown in FIG. 1. The first pressing member 10 and the second pressing member 2 respectively include substrates 12 and 22 which respectively provide basal surfaces 15 and 25 (flat planes) and projecting portions 13 and 23 that are centered on the substrates 12 and 22 so as to project from the basal surfaces 12 and 22. Each of the projecting portions 13 and 23 has a cross-section in the shape of a perfect circle. Also, the projecting portions 13 and 23 have, around their outer circumferential edges, pressing surfaces 11 and 21, respectively. Each of the pressing surfaces 11 and 21 is a tapered surface that is slanted with the diameter becoming progressively smaller away from the planar surfaces 15, 25. In other words, each of the projecting portions 13 and 23 is in the shape of a truncated cone of which the lateral face is the tapered surface. The first pressing member 11 has, on the side opposite the projecting portion 13, a back-side projecting portion 19 for positioning a spring 4, described later.

In order to perform the induction hardening process on the steel member 8, using the hardening jig 1, the first pressing member 10 and the second pressing member 2 are pressed against the steel member 8 from the axially opposite end faces of the steel member 8, as shown in FIG. 1.

Figure 2:
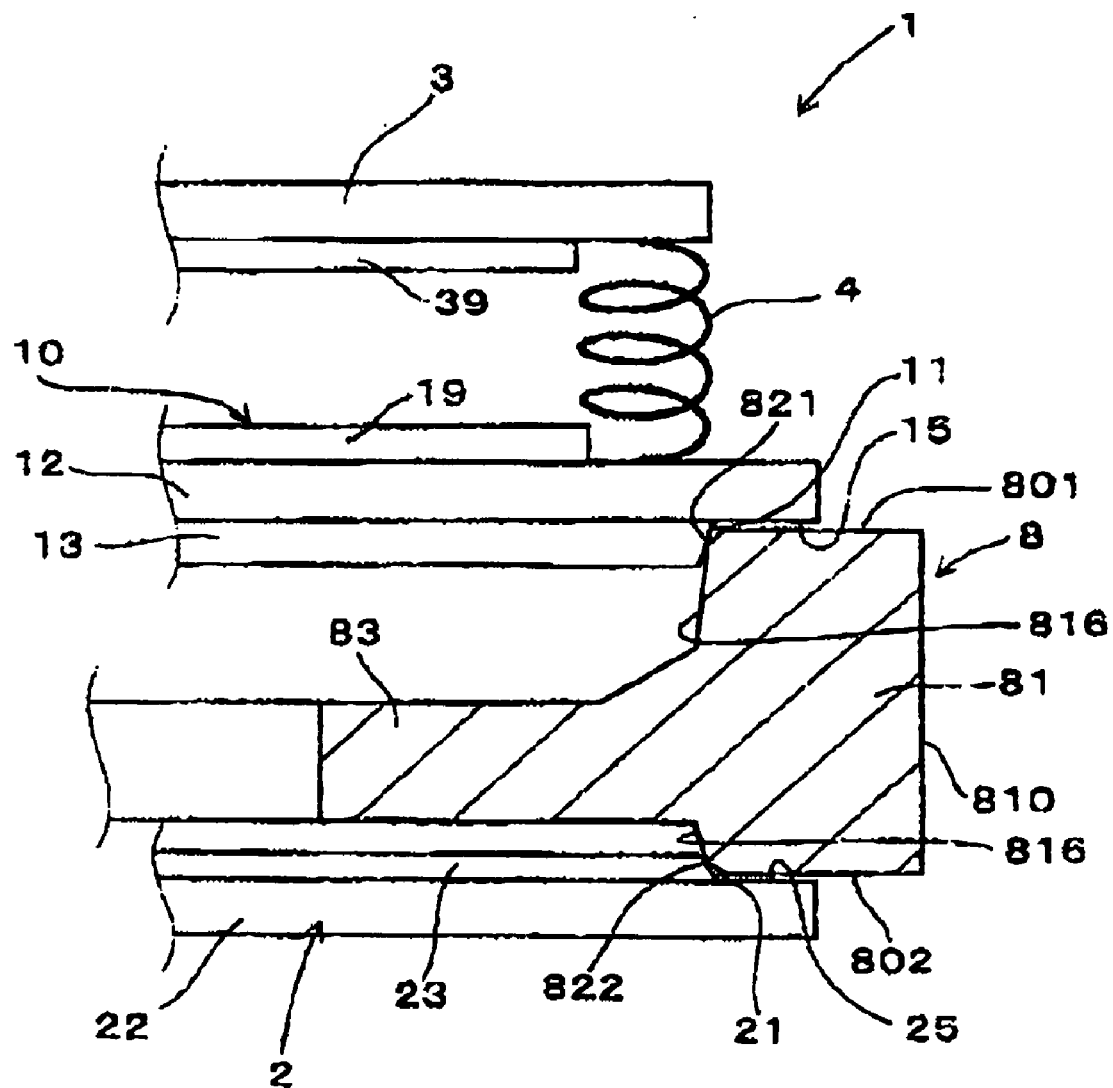
FIG. 2 is a partial schematic view of the jig used in the hardening process applied to a steel member, according to the first embodiment.

Subsequently, as shown in FIG. 2, the tapered surface 11 of the first pressing member 10 abuts the corner 821 that is formed between one axial end face 801, and the inner circumferential surface 816 of the outer ring portion 81. Also, the tapered surface 21 of the second pressing member 2 abuts the corner 822 formed between the other axial end face 802, and the inner circumferential surface 816 of the outer ring portion 81.

Using the jig 1, each of the basal surfaces 15 and 25 of the first pressing member 10 and the second pressing member 2 are maintained axially spaced from the axial end faces 801 and 802 of the outer ring portion 81.

Figure 3:
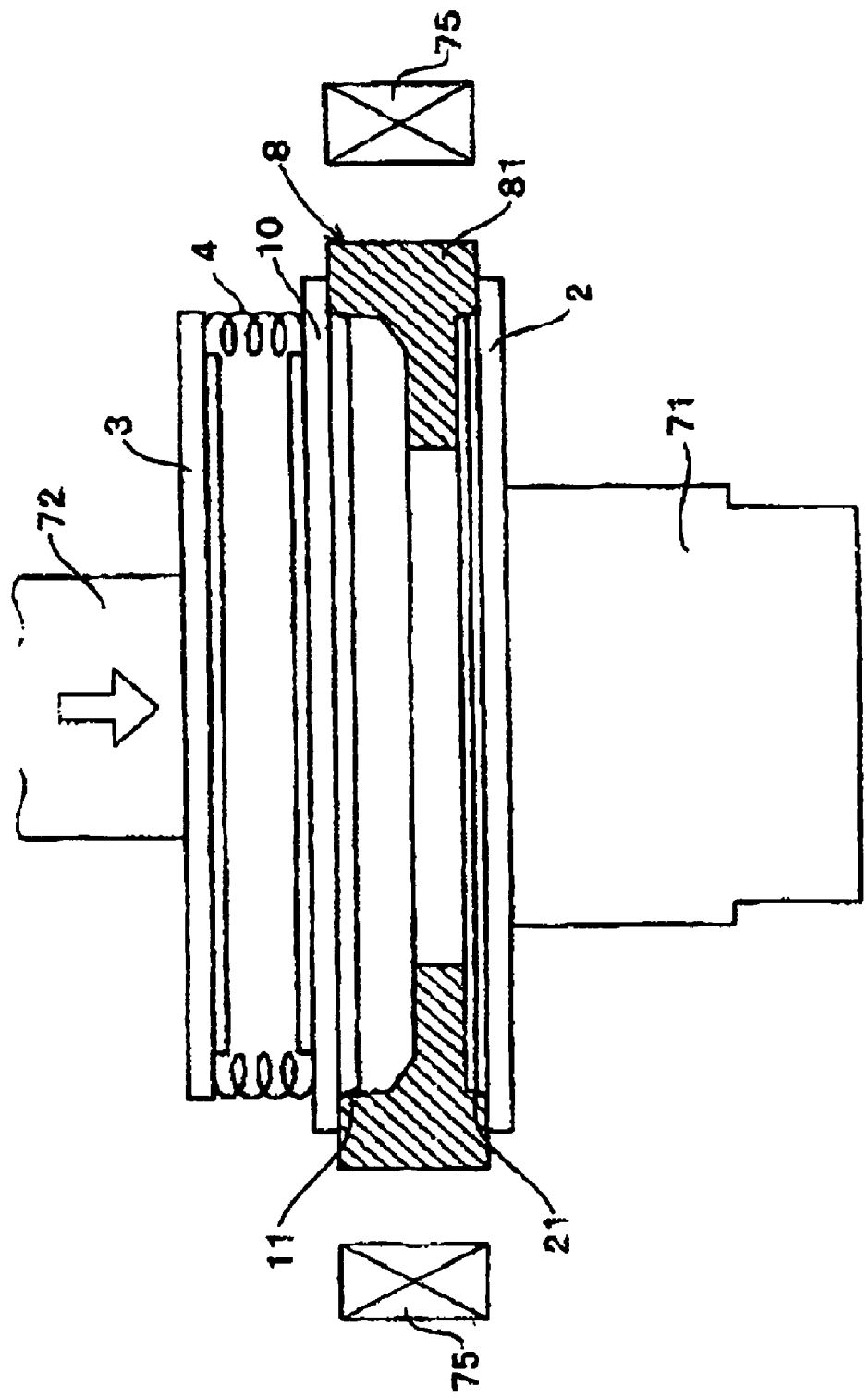
FIG. 3 shows the outer circumferential surface of an outer ring portion of a steel member inductively heated according to the first embodiment.

A biasing board 3 is provided spaced from the first pressing member 10 with the spring 4 interposed therebetween. The spring 4 is located at the outer circumference of the back-side projecting portion 19 on the first pressing member 10 and at the outer circumference of a projecting portion 39 on the biasing board 3. As shown in FIG. 3, the elements described above are supported on a mounting stage 71 in a sequence starting with the second pressing member 2, and the biasing board 3 is pressed downward, with a predetermined pressure, by a biasing shaft 72 that is connected to the biasing board 3.

With pressure applied as described above, electric current is supplied to a coil 75 that is disposed around the outer circumferential surface 810 of the outer ring portion 81 so that the outer circumferential surface 810 is inductively heated.

Due to the induction heating, the outer ring portion 81 thermally expands gradually. Accordingly, as shown in FIGS. 4A to 4D, the position at which the tapered surface 11 of the first pressing member 10 abuts against the corner (apex angle) portion 821 changes from that shown in FIG. 4A to that shown in FIG. 4B. Also, the basal surface 15 moves forward and approaches the steel member 8 up to a position where the basal surface 15 abuts against the axial end face 801 of the outer ring portion 81. The position at which the second pressing member 2 abuts against the corner portion 822 changes in the same manner (not shown in the drawing).

Figure 4A:
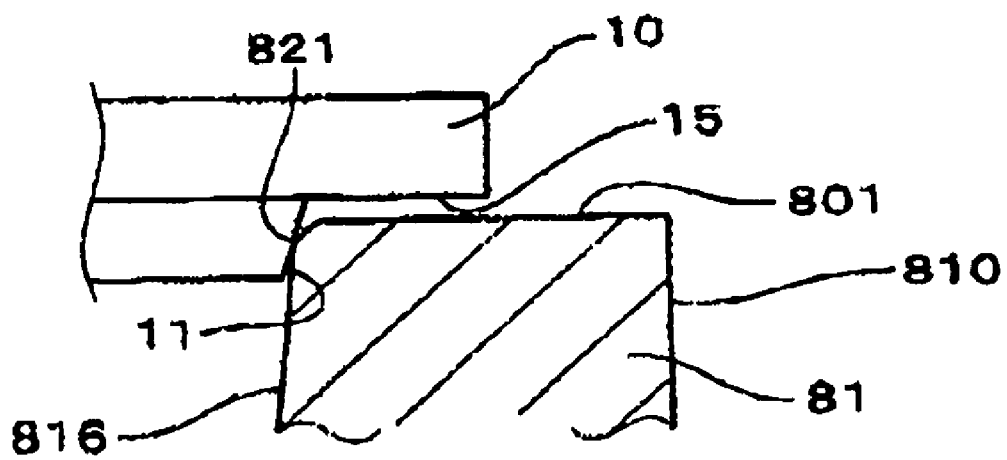
FIG. 4A illustrates contact of the jig with the outer ring portion of the steel member before the outer ring portion thermally expands, according to the first embodiment.
Figure 4B:
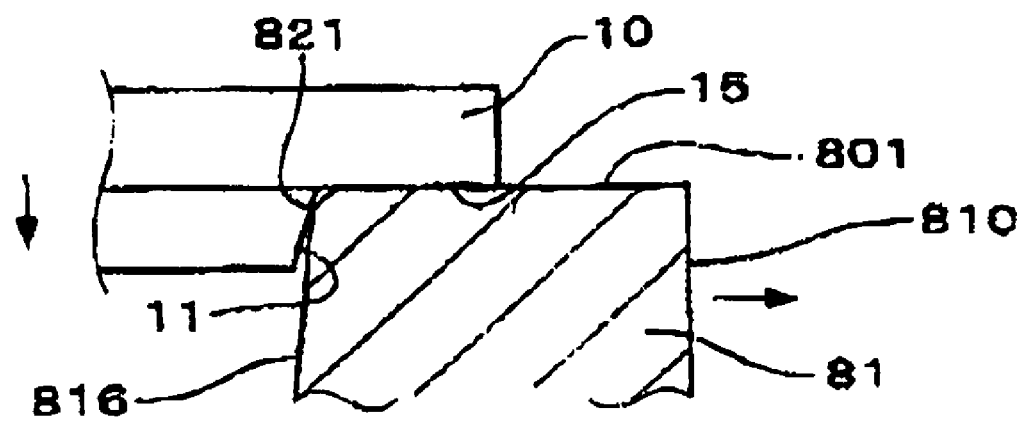
FIG. 4B shows the state in which the outer ring portion has thermally expanded, immediately after the basal surface has come into contact with an axial end face of the outer ring portion, according to the first embodiment.
Figure 4C:
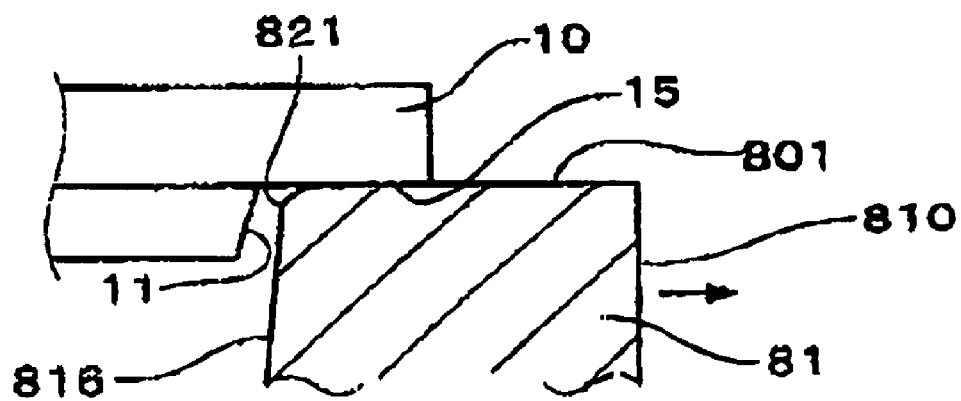
FIG. 4C shows the state in which the outer ring portion has finished thermally expanding and the pressing surface is spaced from the inner circumferential surface of the outer ring portion, according to the first embodiment.

When the outer ring portion 81 thermally expands further, as shown in FIG. 4C, the corner portion 821 on the inner circumference side of the outer ring portion 81 no longer abuts against the pressing surface 12 of the pressing member 10, and thus, there is a gap between them. The positional relationship between the second pressing member 2 and the corner portion 822 changes in the same manner (not shown in the drawing). The roundness of the outer ring portion 81 is maintained by a force exerted from the pressing surface 12, until the outer ring portion 81 is no longer in contact with the pressing surface 12.

Figure 4D:
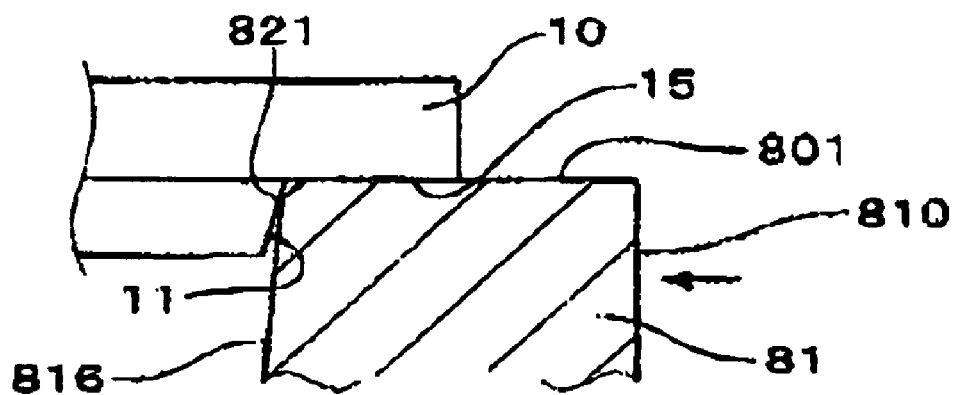
FIG. 4D shows the state after the outer ring portion is cooled, according to the first embodiment.
Figure 5:
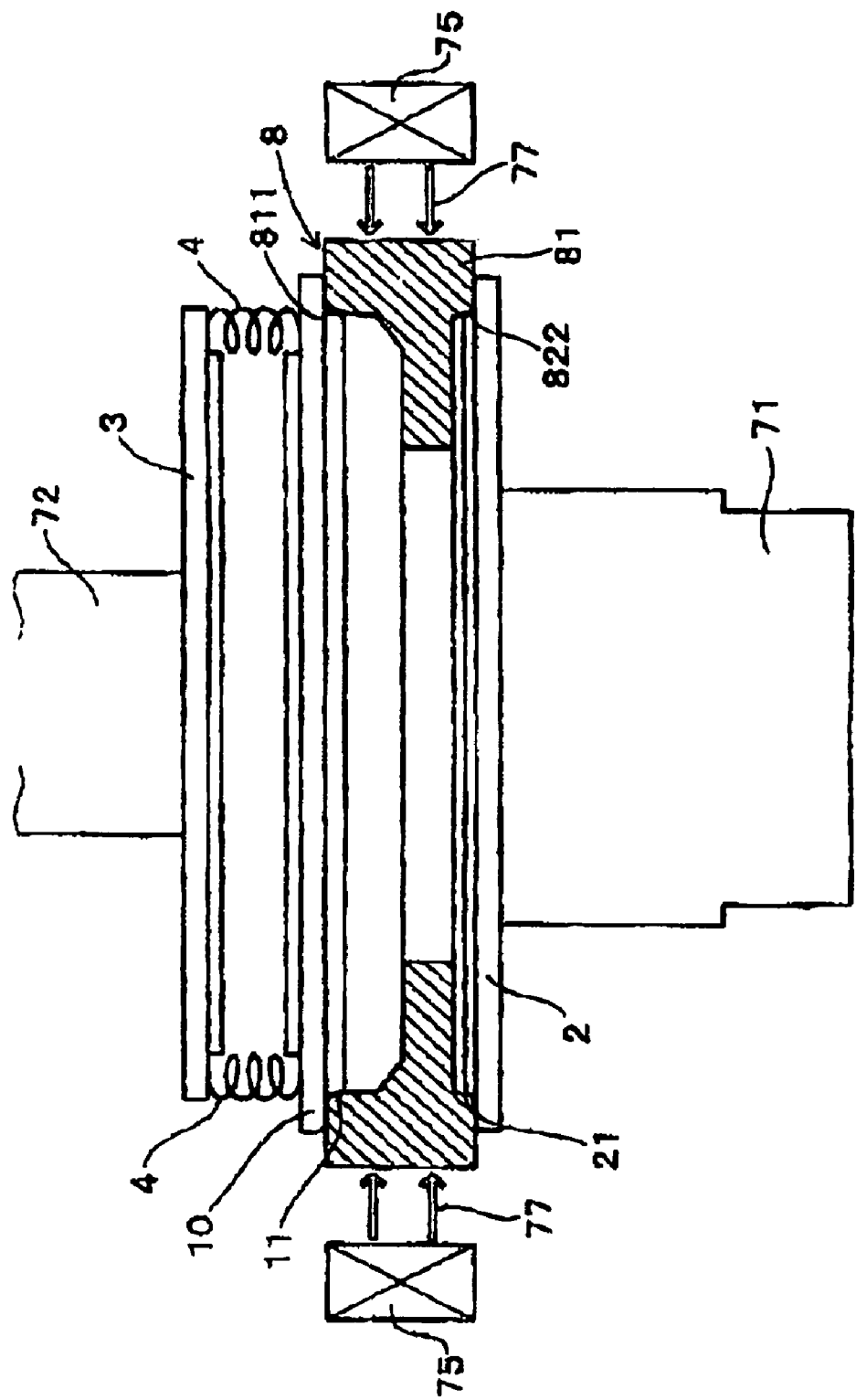
FIG. 5 illustrates the cooling of the outer circumferential surface of the outer ring portion of a steel member with water, according to the first embodiment.
Figure 6:
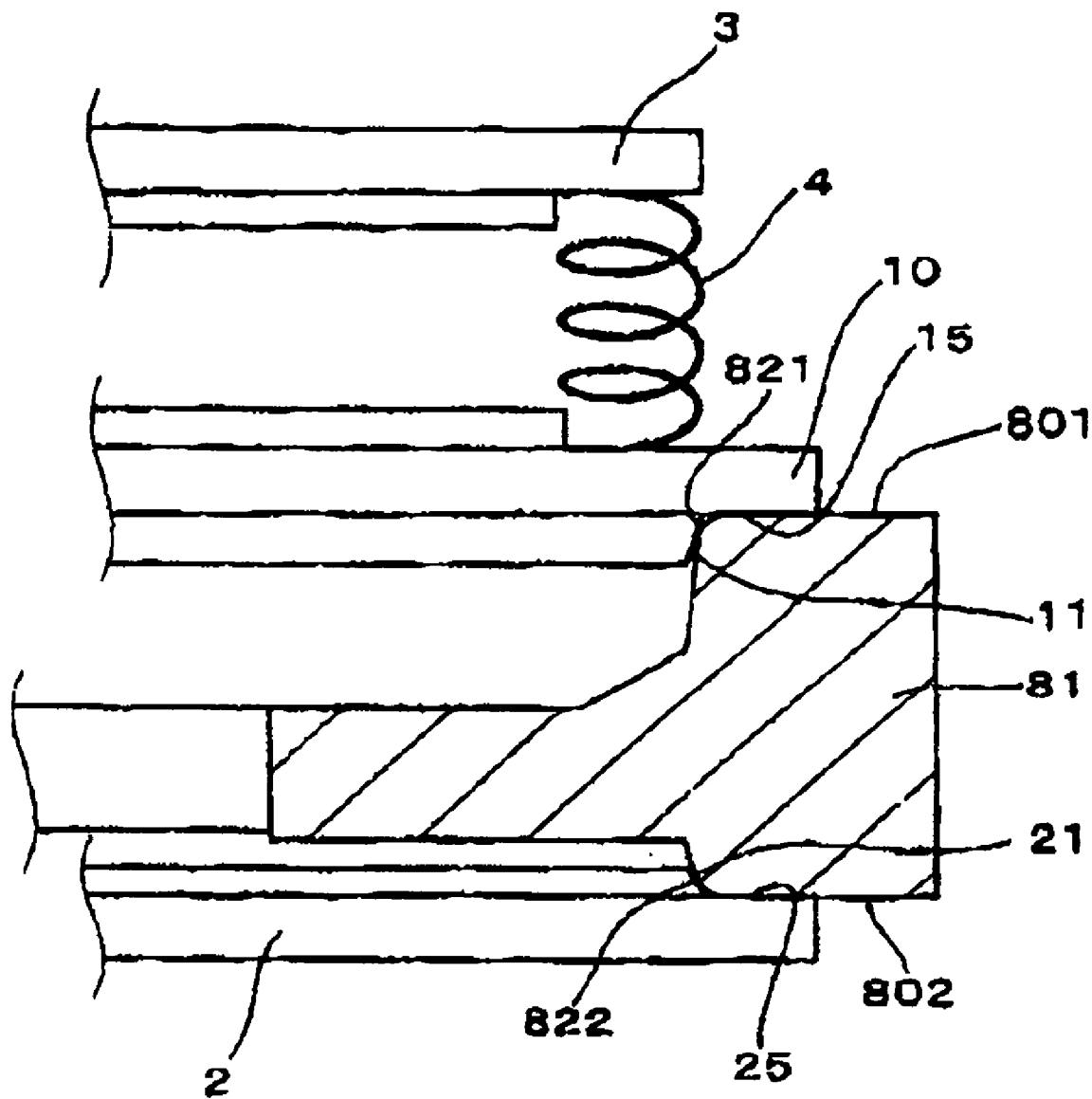
FIG. 6 is another view of the outer ring portion after thermal expansion, according to the first embodiment.
Figure 8A:
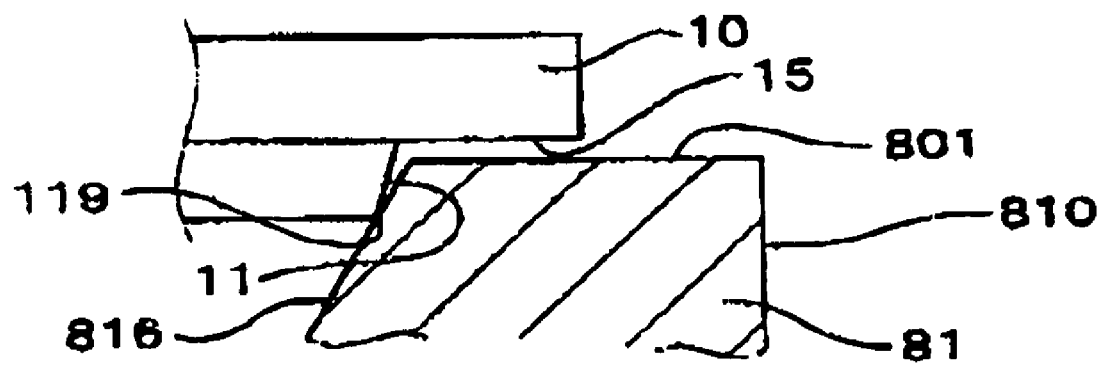
FIG. 8A shows the state before the outer ring portion thermally expands, according to a second embodiment of the present invention.
Figure 8B:
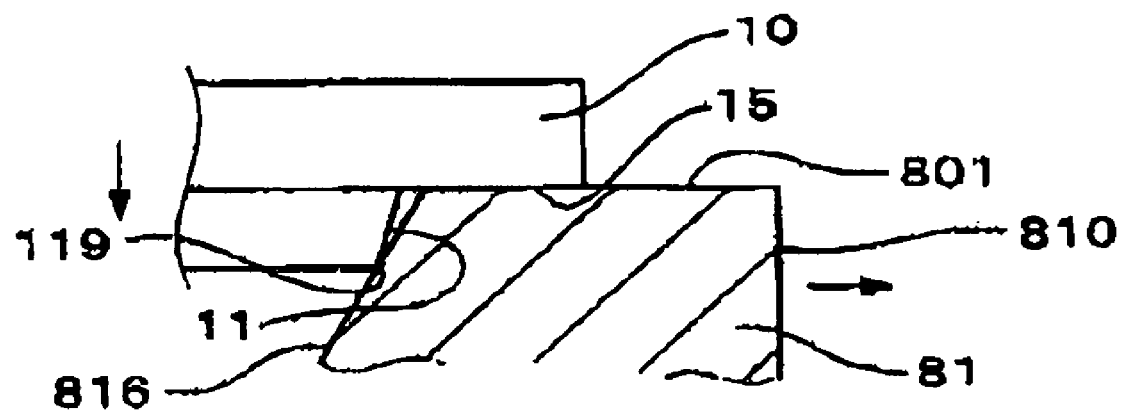
FIG. 8B shows the outer ring portion thermally expanded to the point where the basal surface abuts an axial end face of the outer ring portion according to the second embodiment.
Figure 8C:
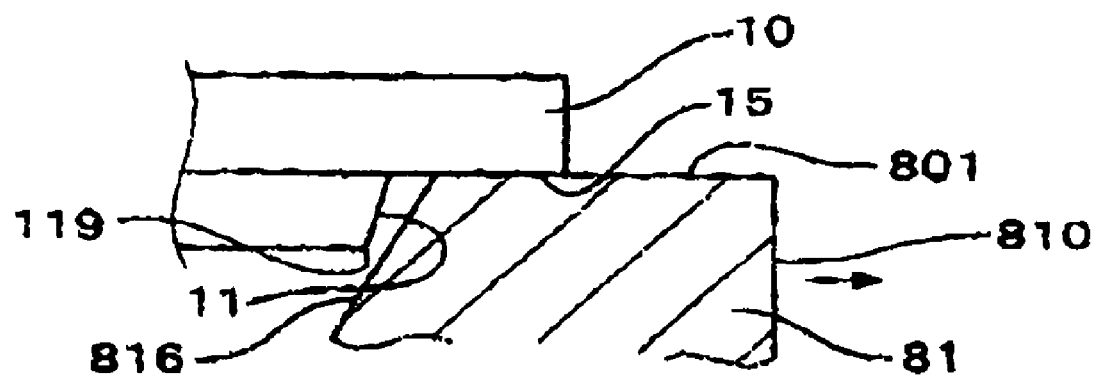
FIG. 8C illustrates the state in which the outer ring portion has finished thermally expanding and the pressing surface has separated from the inner circumferential surface of the outer ring portion, in the second embodiment.
Figure 8D:
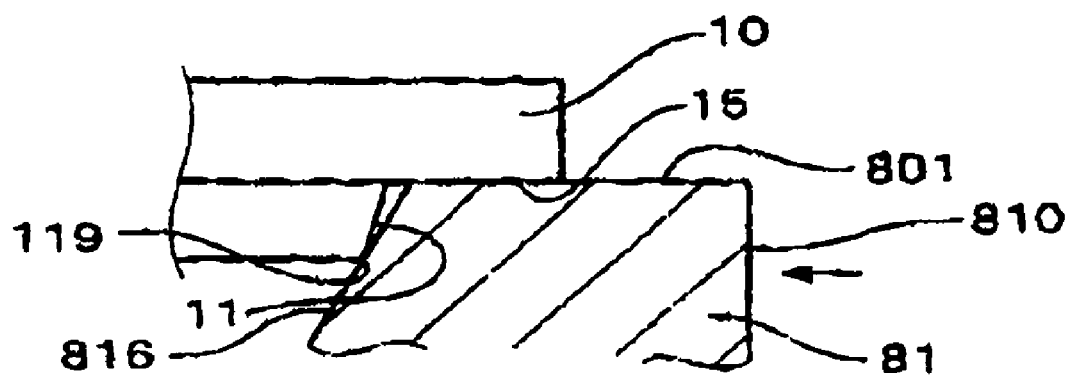
FIG. 8D shows the state after the outer ring portion has cooled, according to the second embodiment.
Figure 9A:
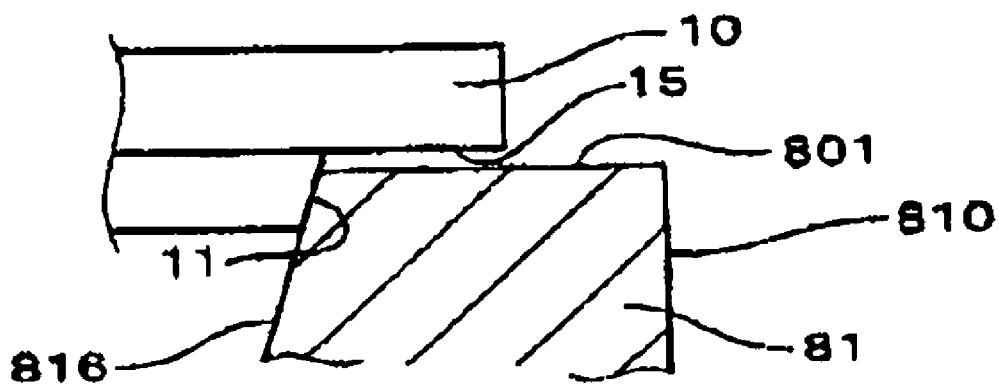
FIG. 9A illustrates the state of contact between a pressing member and the outer ring portion before the outer ring portion has thermally expanded in a third embodiment of the present invention.
Figure 9B:
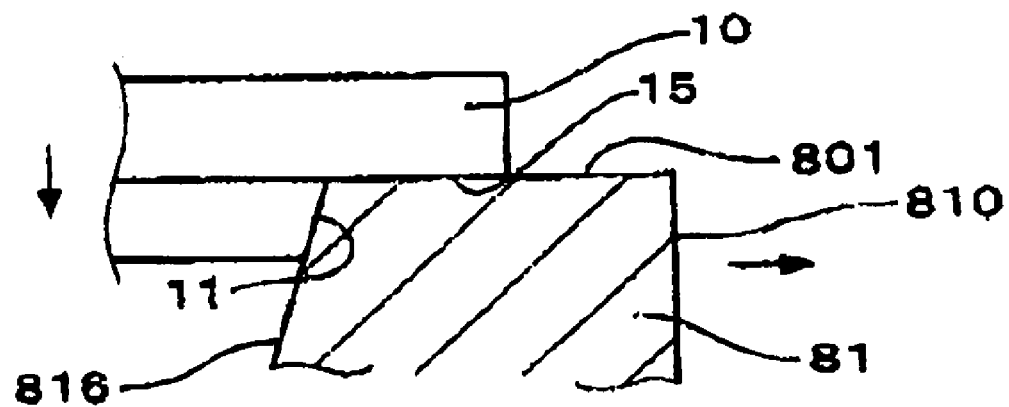
FIG. 9B illustrates the state of contact in which the outer ring portion has thermally expanded to the extent that the basal surface has come into contact with an axial end face of the outer ring portion according to the third embodiment.
Figure 9C:
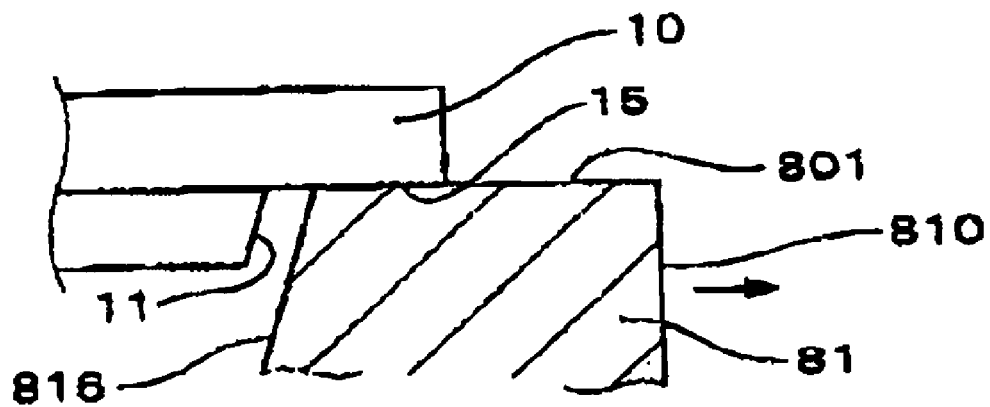
FIG. 9C illustrates the state of contact in which the outer ring portion has finished thermally expanding and the pressing surface is spaced from the inner circumferential surface of the outer ring portion, according to the third embodiment.
Figure 9D:
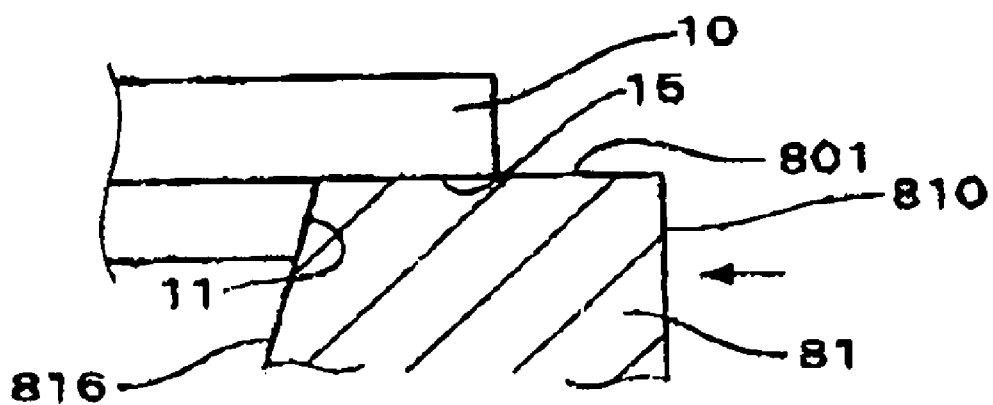
FIG. 9D illustrates the state of contact that is obtained after the outer ring portion has cooled, according to the third embodiment.

Next, as shown in FIG. 5, when the heating of the outer circumferential surface 810 of the outer ring portion 81 has been completed, cooling water 77 is sprayed from the coil 75 to rapidly cool the outer ring portion 81 from the outer circumferential surface 810 inward. As a result, as shown in FIG. 4D and FIG. 6, the outer ring portion 81 contracts due to the cooling. Consequently, once again, the pressing surface 11 of the first pressing member 10 abuts against the corner portion 821 on the inner circumference side of the outer ring portion 81, and the pressing surface 21 of the second pressing member 2 abuts against the corner portion 821 on the inner circumference side of the outer ring portion 81. Accordingly, a force that improves the level of roundness of the outer ring portion 81 is applied to the inner circumference side of the outer ring portion 81 from the pressing surfaces 11 and 21.

Subsequently, the steel member 8 is removed from the hardening jig 1, and thus a sequence of steps in the induction hardening of the steel member 8 is completed.

As described above, the induction hardening method of the first embodiment uses the hardening jig 1 that includes the first pressing member 10 and the second pressing member 2 that are specially configured with the tapered surfaces 11 and 21 extending from basal surfaces 15 and 25, respectively. The tapered surfaces 11 and 21 are arranged so as to abut the corner portions 821 and 822 respectively, while a gap is maintained between the axial end face 801 of the outer ring portion 81 and the basal surface 15 and also between the axial end face 802 of the outer ring portion 81 and the basal surface 25. While the biasing force is applied in a direction biasing the pressing members 10 and 2 toward the steel member 8, the induction hardening process is performed. With this arrangement, it is possible to prevent the degree of roundness of the outer ring portion 81 from being reduced because the tapered surfaces 11 and 21 remain abutted against the corner portions 821 and 822, respectively, during the heating process and the cooling process.

As explained above, by conducting the induction hardening while using the hardening jig 1, it is possible to harden the outer circumferential surface 810 of the ring-shaped steel member 8, without loss in the of roundness of the steel-member 8.

Second Embodiment

According to a second embodiment of the present invention, as shown in FIGS. 8A to 8D, the first pressing member 10 and the second pressing member 2 (not shown in FIGS. 8A to 8D) are arranged in a setting stage before initiating induction hardening, with the first pressing member 10 having a corner (angle) portion 119 on pressing surface 11 of the first pressing member 10 abutting the inner circumferential surface 816 of the outer ring portion 81, and the second pressing member being configured in the same manner as the first pressing member 10.

The second embodiment is different from the first embodiment only in terms of the positions at which the pressing surfaces 11 and 21 of the first and the second pressing members 10 and 2 abut against the inner circumferential side of the outer ring portion 81. Thus, according to the second embodiment, it is possible to achieve the same effect as in the first embodiment.

Third Embodiment

According to a third embodiment of the present invention, as shown in FIGS. 9A to 9D, the first pressing member 10 and the second pressing member 2 are arranged in a setting stage before an induction hardening processing is performed, the first pressing member 10 being configured so that the pressing surface 11 of the first pressing member 10 abuts against the inner circumferential surface 816 of the outer ring portion 81, and the second pressing member being configured in the same manner as the first pressing member 10.

Again, the third embodiment is different from the first embodiment only in terms of the positions at which the pressing surfaces 11 and 21 of the first and the second pressing members 10 and 2 abut against the inner circumferential side of the outer ring portion 81. Thus, according to the third embodiment, it is possible to achieve the same effect as in the first embodiment.

Experimental

In order to quantitatively evaluate the advantageous effect of the first embodiment, the level of roundness was measured as an ellipticity value obtained after a hardening process had been performed, using samples including ones representing another embodiment and comparison examples. All of the samples used in the evaluation were prepared by performing a hardening process on steel members having the same shape.

Sample No. E1 was obtained by induction hardening according to the first embodiment. In other words, the apex angle portions 821 and 822 were pressed in a symmetrical manner on the front and the back of the steel member 8 by the tapered surfaces 11 and 21 of the first pressing member 10 and the second pressing member 2, respectively.

Figure 10:
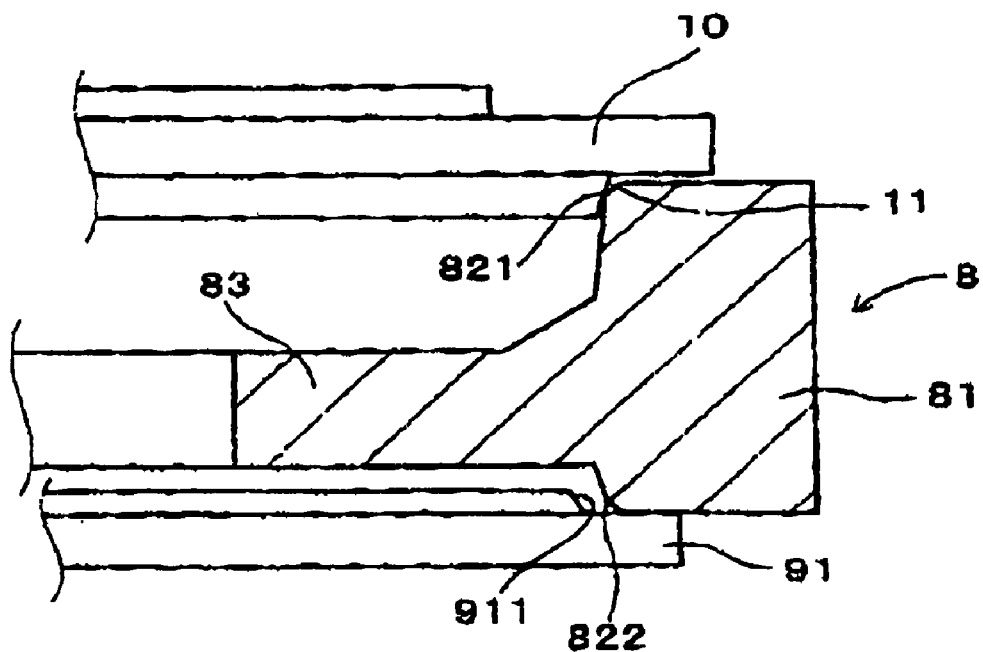
FIG. 10 illustrates positioning of the jig in the hardening process for Sample No. E2, according to a fourth embodiment of the present invention.

Sample No. E2 was obtained by, as shown in FIG. 10, performing the same induction hardening process as the one according to the first embodiment but using a hardening jig having a different configuration. In this hardening jig, the first pressing member 10 that abuts against one axial end face 801, was the same as the one used in the first embodiment, whereas the member that abuts against the other axial end face 802, was a member 91 of which the tapered surface 911 was not at all in contact with the corner (apex angle) portion 822. In other words, this sample was obtained with positions which were asymmetrical as between the opposing axial sides of the steel member 8.

Figure 11:
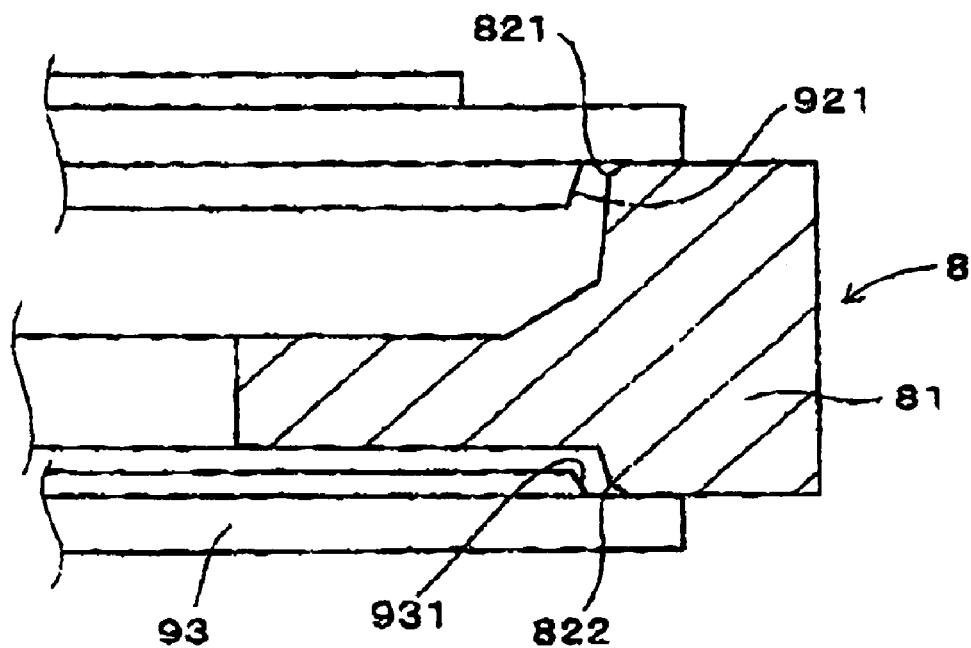
FIG. 11 illustrates positioning of the jig in the hardening process for Sample No. C1, according to the fourth embodiment.

Sample No. C1 was obtained by, as shown in FIG. 11, performing the same induction hardening process as the one according to the first embodiment but using a hardening jig having a different configuration. In this hardening jig, both of the members 92 and 93 that respectively abut against the two axial end faces 801 and 802 were configured so that neither of the tapered surfaces 921 and 931 of the members 92 and 93 was ever in contact with the corner portions 821 and 822. In other words, in this example the corner portions 821 and 822 of the outer ring portion 81 were not restrained and were free.

Figure 12:
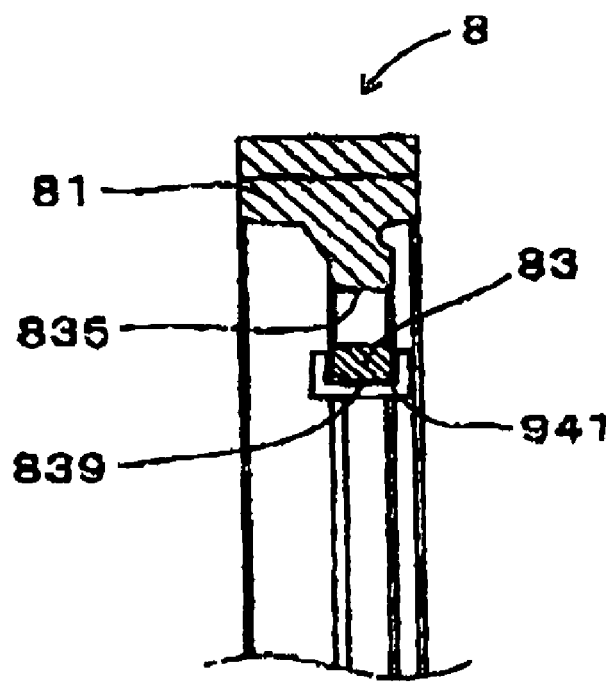
FIG. 12 illustrates the jig as used in the hardening process for Sample No. C2, according to the fourth embodiment.

As shown in FIG. 12, sample No. C2 was obtained by performing a carburization hardening process, in which the steel member was rapidly cooled after being carburized, instead of an induction hardening process. This hardening jig included a stage 941 supporting the inner circumferential surface 835 of the inner annular portion 83, while the steel member 8 was disposed in such a manner that its axis extended horizontally.

In order to evaluate the level of roundness of each of the samples, the diameter of the outer circumference defined by surface 810 of the outer ring portion 81 was measured at a plurality of radially spaced positions and at three axially spaced positions (top, middle, and bottom). The difference between the largest diameter and the smallest diameter was calculated as an ellipticity value (μm).

Also, average values of diameters were calculated at two axially spaced positions, namely at a top position and a bottom position, and the difference (μm) between the average values was calculated as taper.

Figure 13:
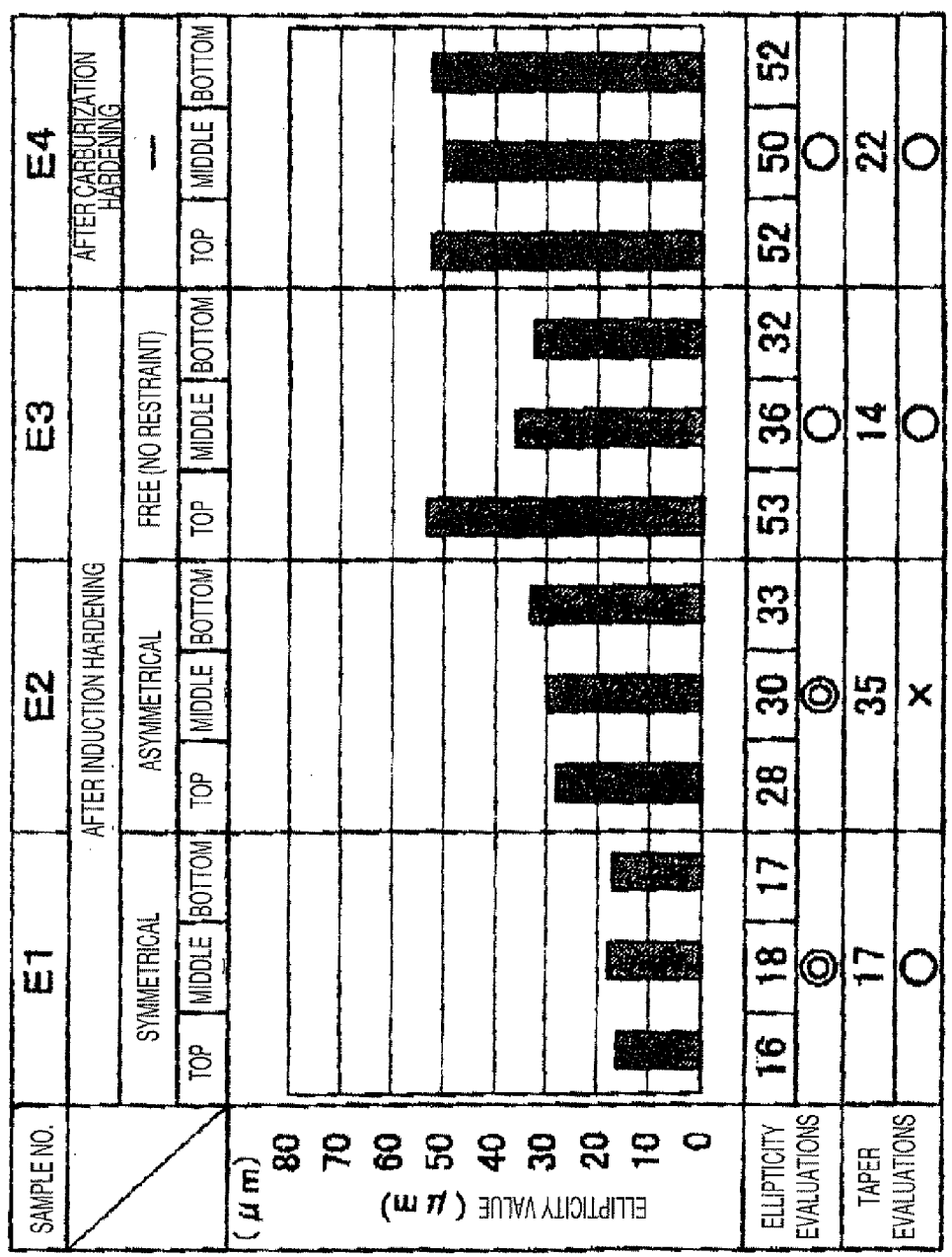
FIG. 13 is a table of test results and evaluations obtained according to the fourth embodiment.

FIG. 13 shows the measurements and the evaluations. In FIG. 13, the measurements of ellipticity values are shown as bars for the different positions. Shown below the bars are the ellipticity values and the evaluations. In addition, the values for taper and the evaluations are shown further below.

As can be understood from the drawing, Sample No. E1 according to the first embodiment showed the smallest ellipticity value at all of the measuring positions and exhibited an extremely high level of roundness. In addition, the amount of taper was very small, and also, the diameter varied very little between axially spaced position.

Sample No. E2 had a smaller ellipticity value than Samples No. C1 and No. C2 as explained below. No. E2 had a sufficiently high level of roundness. On the other hand, the amount of taper was relatively larger, and also, the diameter varied between the axially spaced positions by a larger amount. It is assumed that these results were caused because the process was performed with asymmetrical pressing. Also, it is understood that the process conditions used for No. E2 were sufficient for a product that is satisfactory for its intended use as long as the level of roundness is high.

On the other hand, while each of Samples No. C1 and No. C2 had a small amount of taper and the diameter varied little in the axial direction, the loss of roundness was greater than Samples No. E1 and No. E2.

The invention claimed is:

1. An induction hardening method for hardening a steel member having an outer ring portion substantially in a shape of a circular tube with an outer circumferential surface and an inner circumferential surface surrounding a central opening and extending to a first axial end face, wherein the outer circumferential surface of the outer ring portion is hardened, the induction hardening method comprising:

providing a first pressing member that includes a first substrate having an annular a flat first basal surface surrounding a first projecting portion provided at a central portion of the first substrate and projecting from the first basal surface, the first projecting portion having a cross-section in the shape of a circle and having an outer circumferential first pressing surface, the first pressing surface of the first pressing member being tapered so that the outside diameter of the first projecting portion becomes smaller toward a distal end thereof;

pressing the central portion of the first pressing member into the central opening of the outer ring portion while initially maintaining a gap between the first axial end face and the first basal surface, so that at least a part of the first pressing surface presses against the inner circumferential surface of the outer ring portion;

applying induction hardening, with induction heating, to the outer circumferential surface of the outer ring portion, while an axial force is applied to the first pressing member pressing it against the steel member; and continuing to move the first pressing member forward relative to the steel member, further into the central opening, to maintain abutment of the first pressing surface against the inner circumferential surface of the outer ring portion, as the outer ring portion thermally expands, while continuing the induction heating, until the first basal surface abuts against the first axial end face in parallel therewith.

2. The induction hardening method according to claim 1, further comprising:

providing a second pressing member that includes a second substrate having an annular flat second basal surface surrounding a second projecting portion provided at a central portion of the second substrate and projecting from the second basal surface, the second projecting portion having a cross-section in the shape of a circle and having an outer circumferential edge serving as a second pressing surface, the second pressing surface of the second pressing member being tapered so that the outside diameter of the second projecting portion becomes smaller toward a distal end thereof;

pressing the second pressing member toward a second axial end face of the steel member, axially opposite the first axial end face, with the second pressing surface abutting an inner circumferential surface of the outer ring portion; and applying the induction hardening to the steel member while an axial biasing force is applied to force the first and second pressing members together.

3. The induction hardening method according to claim 2, wherein:

the steel member is a ring gear that teeth on the outer circumferential surface of the outer ring portion.

4. The induction hardening method according to claim 3, wherein:

the steel member is a ring gear that has teeth on the outer circumferential surface of the outer ring portion.

5. The induction hardening method according to claim 2, wherein:

each pressing member is in the shape of a truncated cone having a flat planar surface at its distal end; and further comprising;

abutting a tip angle portion, where the pressing surface joins the flat planar surface, against the inner circumferential side of the outer ring portion.

6. The induction hardening method according to claim 5, wherein:

the steel member is a ring gear having teeth on the outer circumferential surface of the outer ring portion.

7. The induction hardening method according to claim 2, wherein:

the steel member is a ring gear having teeth on the outer circumferential surface of the outer ring portion.

8. The induction hardening method according to claim 1, wherein:

the steel member is a ring gear having teeth on the outer circumferential surface of the outer ring portion.

9. The induction hardening method according to claim 1, wherein:

the first pressing surface of the first pressing member is a tapered surface that is slanted so that an outside diameter of the first pressing member becomes smaller toward a distal end thereof.

10. The induction hardening method according to claim 9, wherein:

the first pressing surface of the first pressing member abuts against an apex at the intersection between the first axial end face and an inner circumferential surface of the outer ring portion.

11. The induction hardening method according to claim 10, wherein:
the steel member is a ring gear having teeth on the outer circumferential surface of the outer ring portion.

12. The induction hardening method according to claim 9, wherein:
the first pressing member is in the shape of a truncated cone having a flat planar surface at its distal end; and
an angular portion of the first pressing member, formed at the intersection of the flat planar surface and the first pressing surface, abuts against the inner circumferential surface of the outer ring portion.

13. The induction hardening method according to claim 12, wherein:
the steel member is a ring gear having teeth on the outer circumferential surface of the outer ring portion.

14. The induction hardening method according to claim 1, wherein:
the first pressing member is in the shape of a truncated cone having a flat planar surface at its distal end; and
an angular portion of the first pressing member, formed at the intersection of the flat planar surface and the first pressing surface, abuts against the inner circumferential surface of the outer ring portion.

* * * * *